US012172876B2

(12) United States Patent
Iotti (10) Patent No.: US 12,172,876 B2
(45) Date of Patent: Dec. 24, 2024

(54) ROTARY TELEHANDLER WITH MULTIPLE ASCENT AND DESCENT PATHS

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 638 days.

(21) Appl. No.: 17/460,931

(22) Filed: Aug. 30, 2021

(65) Prior Publication Data

US 2022/0073328 A1    Mar. 10, 2022

(30) Foreign Application Priority Data

Sep. 8, 2020    (IT) .................. 102020000021244

(51) Int. Cl.
| | |
|---|---|
| *B66F 9/075* | (2006.01) |
| *B60R 3/00* | (2006.01) |
| *B66F 9/065* | (2006.01) |

(52) U.S. Cl.
CPC .............. *B66F 9/0759* (2013.01); *B60R 3/00* (2013.01); *B66F 9/0655* (2013.01)

(58) Field of Classification Search
CPC ................................ B60R 3/00; B66F 9/0759
See application file for complete search history.

(56) References Cited

U.S. PATENT DOCUMENTS

| | | |
|---|---|---|
| 6,305,737 B1 | 10/2001 | Corder et al. |
| 10,035,462 B2 | 7/2018 | Iotti |

(Continued)

FOREIGN PATENT DOCUMENTS

| | | |
|---|---|---|
| DE | 3020206 A1 | 12/1980 |
| GB | 2053811 A | 11/1981 |

(Continued)

OTHER PUBLICATIONS

Notice of Opposition to a European Patent—Patent No. EP3964472, Application No. EP21189156.9, Notice dated: Dec. 27, 2023, 8 pages.

(Continued)

*Primary Examiner* — Tony H Winner
*Assistant Examiner* — Hosam Shabara
(74) *Attorney, Agent, or Firm* — Pearne & Gordon LLP; J. Gregory Chrisman (57) ABSTRACT

Described is a rotary telehandler (1) comprising a carriage (10) movable on wheels, which mounts a tower (11), which in turn mounts a drivers cab (12) and an operating arm. The telehandler (1) is equipped with the following free paths of ascent and descent: a first path, defined by a first position of the tower (11), wherein it has an axis parallel to that of the carriage (10) and comprises a door (15) of the cab (12), a handle (17) on which an operator can grasp and a ladder (101, 104) made on a side wall of the carriage (10); a second path, defined by an angled position of the tower (11), wherein it is oblique or transversal to the axis of the carriage (10), with a front of the cab (12) facing towards the inside of the carriage (10), the second path comprising the door (15), a first handle (16) mounted at a first side of the door (15), a treadable surface (105, 106) of the carriage (10) and a further ladder (102, 103) made in a side of the carriage (10); and a third path, defined by a further angled position of the tower (11), wherein it is oblique or transversal to the axis of the carriage (10), with the front of the cab (12) facing towards the outside of the carriage (10), the third path comprising the door (15), a second handle (17) mounted at a second side of the door (15), a treadable surface (103, 102) of the carriage (10) and a ladder (104, 103) made in a further side of the carriage (10).

(Continued)

The first, second and third paths are free of obstacles for the free passage of an operator.

10 Claims, 6 Drawing Sheets

(56) References Cited

U.S. PATENT DOCUMENTS

| 10,093,238 | B2 | 10/2018 | Koga | |
|---|---|---|---|---|
| 11,180,943 | B2 * | 11/2021 | Khan | E05F 15/42 |
| 11,667,241 | B2 * | 6/2023 | Koshy | B60R 3/005 256/26 |
| 2017/0182946 | A1 | 6/2017 | Iotti | |
| 2017/0190293 | A1 | 6/2017 | Koga | |
| 2020/0011111 | A1 | 1/2020 | Khan et al. | |

FOREIGN PATENT DOCUMENTS

| JP | 2009024414 A | 2/2009 |
|---|---|---|
| JP | 2010053663 A | 3/2010 |
| KR | 20080053765 A | 6/2008 |

OTHER PUBLICATIONS

Acknowledgement of Receipt of Notice of Opposition (to Patent No. EP3964472, Application No. EP21189156.9), Submision No. 12765707, Date of Receipt: Dec. 27, 2023, 2 pages.

Consolidated List of cited opposition documents, from Opposition to a European Patent—Patent No. EP3964472, Application No. EP21189156.9, Opposition filed: Dec. 27, 2023, 1 page.

Facts and Arguments in Support of Opposition to a European Patent13 Patent No. EP3964472, Application No. EP21189156.9, Opposition filed Dec. 27, 2023, pp. 1-64.

Annex A3a, evidence cited in Opposition to a European Patent—Patent No. EP3964472, Application No. EP21189156.9, Website URL: https://www.youtube.com/watch?v=1gnXzyShlGo, Uploader: Link-Belt Cranes YouTube Channel, Date of upload: Dec. 1, 2014, Wayback machine capture https://web.archive.org/web/20231219160445/https://www.youtube.com/watch?v=1gnXzyShlGo, 8 pages.

Exhibit P1a, evidence cited in Opposition to a European Patent—Patent No. EP3964472, Application No. EP21189156.9, Exhibit witnessed Dec. 8, 2023 of email dated Sep. 17, 2019 with interim brochure and copy of interim brochure, 13 pages.

Exhibit P1a, evidence cited in Opposition to a European Patent—Patent No. EP3964472, Application No. EP21189156.9, Exhibit with full size copy of interim brochure which accompanied Exhibit P1a, 7 pages.

Exhibit P1AH, evidence cited in Opposition to a European Patent—Patent No. EP3964472, Application No. EP21189156.9, Exhibit witnessed Dec. 8, 2023—Witness statement of Andrew Colin Hartley regarding photos of machine taken Nov. 21, 2023, 4 pages.

Exhibit P1b, evidence cited in Opposition to a European Patent—Patent No. EP3964472, Application No. EP21189156.9, Exhibit witnessed Dec. 8, 2023 of email dated Nov. 27, 2019 with quotation for machine and copy of quotation—Witness statement of Ben Ian Gerard Williamson, 6 pages.

Original file name: P1BW, evidence cited in Opposition to a European Patent—Patent No. EP3964472, Application No. EP21189156.9, Exhibit witnessed Dec. 8, 2023 regarding Exhibits P1a to P1f—Witness statement of Ben Ian Gerard Williamson, 5 pages.

Exhibit P1c, evidence cited in Opposition to a European Patent—Patent No. EP3964472, Application No. EP21189156.9, Exhibit witnessed Dec. 8, 2023 regarding photos of machine taken Jan. 17, 2020 to Jan. 19, 2020—Witness statement of Ben Ian Gerard Williamson, 6 pages.

Exhibit P1d, evidence cited in Opposition to a European Patent—Patent No. EP3964472, Application No. EP21189156.9, Exhibit witnessed Dec. 8, 2023 regarding screenshot of Facebook post dated Jan. 17, 2020—Witness statement of Ben Ian Gerard Williamson, 3 pages.

Exhibit P1e, evidence cited in Opposition to a European Patent—Patent No. EP3964472, Application No. EP21189156.9, Exhibit witnessed Dec. 8, 2023 regarding photos of machine taken Nov. 21, 2023—Witness statement of Ben Ian Gerard Williamson, 10 pages.

Exhibit P1e2, evidence cited in Opposition to a European Patent—Patent No. EP3964472, Application No. EP21189156.9, Exhibit witnessed Dec. 8, 2023 regarding photos of machine taken Nov. 21, 2023—Witness statement of Andrew Colin Hartley, 10 pages.

Exhibit P1f, evidence cited in Opposition to a European Patent—Patent No. EP3964472, Application No. EP21189156.9, Exhibit witnessed Dec. 8, 2023 regarding screenshots of Facebook video at link https://www.facebook.com/operatortraining/videos/957072351421957/?mibextid=rS40aB7S9Ucbxw6v—Witness statement of Ben Ian Gerard Williamson, 16 pages.

Exhibit P1g, evidence cited in Opposition to a European Patent—Patent No. EP3964472, Application No. EP21189156.9, Exhibit witnessed Dec. 8, 2023 regarding screenshots of delivery portal showing delivery details of machine—Witness statement of Lee Mark Turnock, 3 pages.

Original name: P1LT, evidence cited in Opposition to a European Patent—Patent No. EP3964472, Application No. EP21189156.9, Exhibit witnessed Dec. 8, 2023 regarding delivery of machine on Jan. 17, 2020 regarding Exhibit P1g—Witness statement of Lee Mark Turnock, 3 pages.

* cited by examiner

ROTARY TELEHANDLER WITH MULTIPLE ASCENT AND DESCENT PATHS

This invention relates to a rotary telehandler with multiple paths for ascent and descent into/from the cab.

Prior art telehandlers are known, consisting of a vehicle equipped with a frame or "carriage" that is movable on wheels, which comprises a rotary platform which in turn mounts the driver's cab and a movement arm which can be extended telescopically.

At the distal end of the arm there is an apparatus for lifting or moving loads, such as, for example, a fork, a cage, a lateral transfer unit, a winch, etc.

The cab, where the driving position is located, is mounted on the rotatable turret alongside the hinge of the operating arm, which constrains its lifting and lowering movements.

In the outer side opposite to the side adjacent to the arm, that is, usually the left side, the cab has the access door and the door for closing and opening; on both sides of the carriage, beneath the cab and substantially aligned with the door of the cab when this is in one of the two opposite positions, parallel to the axis of the telehandler, there are the ascent and descent ladders to climb into the cab or descend from the operating machine.

Since the telehandler often operates with the tower set at an angle to the axis of the carriage, it is often tricky and time-consuming for the operator to re-align the tower each time he/she must descend from the vehicle.

For this reason, the operator may decide to exit from the cab when the tower is still in an angled position, climbing from the carriage and then descending to the ground; obviously, for returning into the cab, the operator must climb again on the carriage and then, from this, onto the cab.

In the prior art telehandlers this operation is already risky when the tower is set at an angle with the door facing towards the front part of the carriage, and should therefore be avoided, and it becomes really dangerous when the tower is set at an angle with the door facing towards the back, due to the overall dimensions represented by the door.

The technical purpose which forms the basis of the invention is to provide a rotary telehandler which overcomes the drawbacks of the prior art.

The specified aim is attained by the invention made according to claim 1. Further characteristics and advantages of the present invention will become more apparent in the non-limiting description of a preferred but non-exclusive embodiment of the proposed telehandler, as illustrated in the accompanying drawings, in which:

With reference to the accompanying drawings, the numeral 1 denotes in its entirety a rotary telehandler made in accordance with the invention.

Figure 1:
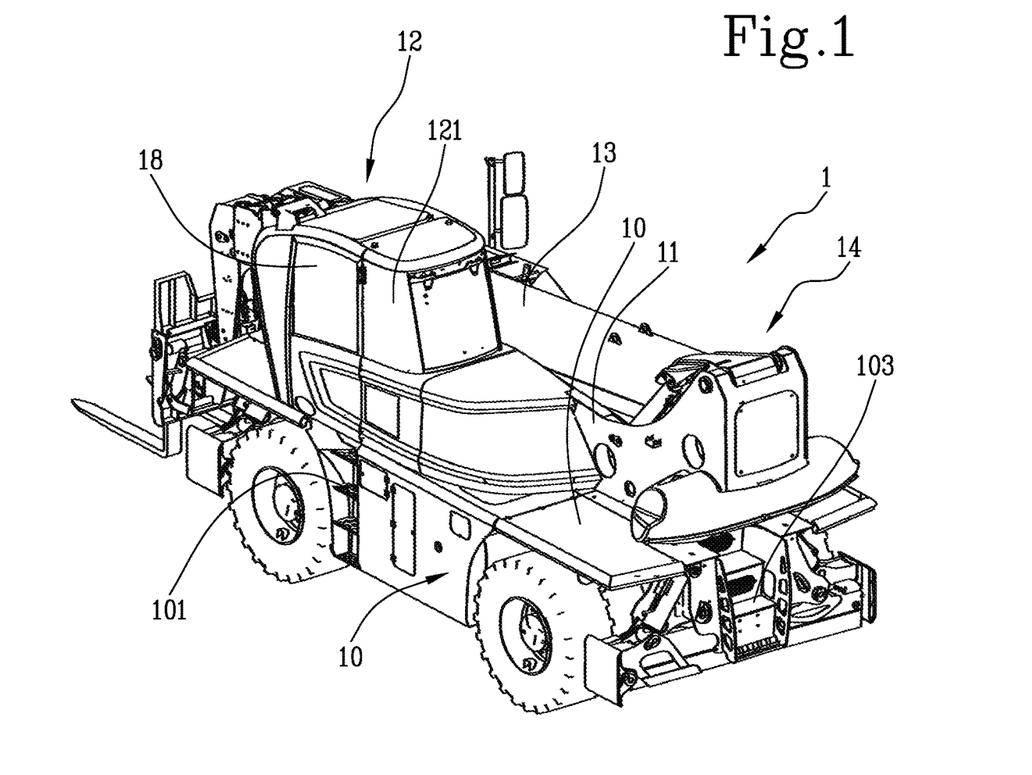
FIG. 1 is a rear perspective view of the telehandler according to the invention, with the door of the cab closed.

The proposed telehandler is equipped with a frame, or "carriage", 10, which is movable on wheels, which has a rotating platform, or "tower" 11, which in turn mounts both the driver's cab 12 and an operating arm 13 which can be extended telescopically (shown only in FIG. 1, for reasons of legibility of the other drawings).

The arm 13 is articulated to the tower 11, by means of an axis 14 with a horizontal axis, so as to oscillate vertically, under the actuation of a hydraulic cylinder or similar actuator, between a lower position, substantially horizontal, and an upper position wherein the arm 13 is close to the vertical. More in detail, the tower may comprise a support structure 11 alongside which the cab 12 is fixed and forms the above-mentioned hinge 14 to which the arm 13 is fixed.

The rotation of the tower 11 is also produced by a preferably hydraulic actuator, associated, for example, with a rack.

According to an important aspect of the invention, the carriage 10 has a substantially rectangular perimeter and has an ascending and descending ladder 101, 102, 103, 104 on each side; more precisely, the ladders 101, 104 positioned on the long sides of the carriage 10 are substantially symmetrical relative to a diagonal of the perimeter; moreover, preferably, the ladders are incorporated in the frame of the carriage 10 and not shown. Moreover, on the upper surface, close to the ladders 102, 103 of the two opposite short sides, the carriage 10 is provided with respective treadable planes 105, 106.

The invention has been conceived to allow the operator to safely move into and out from the driving position in the cab 12, even if the tower 11 is not aligned with the axis of the carriage 10, that is, with its central axis of longitudinal extension.

In other words, the telehandler 1 according to the invention advantageously allows the operator to safely fit and remove irrespective of the angular position of the tower 11.

For this purpose, the telehandler 1 according to the invention comprises a plurality of ascending and descending paths, which are free, that is to say, without obstacles or impediments and which are designed to favour the climbing from the ground to the driving position and the opposite descending path, regardless of the angular orientation of the tower 11. According to the preferred embodiment, illustrated in the drawings, there are six free ascending and descending paths.

These six paths correspond to as many configurations of use of the telehandler 1, characterised by various sets of angular positions of the tower 11 and by the access to respective physical structures of the telehandler 1. However, as will become clearer from the following description, given the symmetrical shape of the carriage 10, at least with regard to the position of the ladders 101, 102, 103, 104, the six free paths may be divided into three separate pairs, characterised by the same structure of the path and the same method of use by the operator.

Since it is possible to identify a front side and a rear side of the carriage 10, joined by the right and left sides, then it is possible to identify six possible configurations of use of the telehandler 1 which correspond to the above-mentioned six free paths.

The first path is defined by the front position of the tower 11 (FIGS. 3, 4, 5 and 6), wherein it has its axis parallel to that of the carriage 10 and comprises: the entrance and exit door 15 formed on the side of the cab 12, one or more handles 16, 17, to which the operator can grip whilst ascending or descending and the first ladder 101 formed on a side of the carriage 10. In the case shown, the cab 12 is located on the left of the operating arm 13 relative to the direction of travel of the carriage 10, the first ladder 101 is formed on the left side of the carriage 10 and the door 15 is formed on the left side of the cab 12; moreover, there may be a first handle 16 mounted on a left side (or upright) of the door 15 of the cab 12, relative to the entrance direction, and a second handle 17 mounted on the opposite side, or upright, both of the handles 16, 17 being able to be parallel to the respective side and having a length equal to most of that of the respective side.

Figure 7:
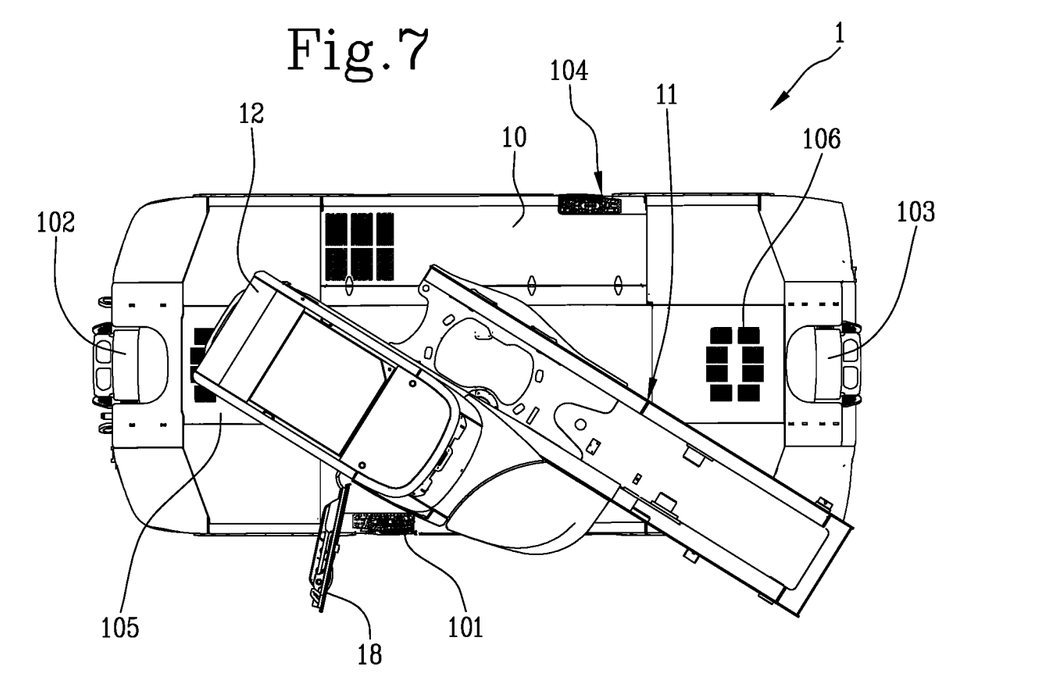
FIGS. 7 and 8 are top views of the proposed telehandler in two different configurations of use.

The second path is defined by a front angled position of the tower 11, wherein it is oblique relative to the axis of the carriage 10, with the door 15 of the cab 12 which is substantially facing towards a front part of the carriage 10 (see FIG. 7).

More generally speaking, in this second configuration the front of the cab 12 faces towards the inside of the carriage 10.

The second path includes the door 15 of the cab 12, the above-mentioned first handle 16, which in general terms is mounted on the most advanced side of the door 15, the first treadable surface 105 of the front part of the carriage 10 and the second ladder 102 formed in the front side of the carriage 10.

In practice, again in the preferred case wherein the cab 12 is on the left of the arm, the second path is defined when the tower 11 is rotated towards the right.

In the front angled position, the door 15 of the cab 12 is above the upper surface of the carriage 10 which forms the above-mentioned first treadable surface 105, so that the operator can pass between one and the another using the first handle 16.

The first treadable surface 105 terminates in the second ladder 102, which allows the descent to the ground, which is integrated or incorporated in the carriage 10 at the front side of it.

In practice, the second ladder 102 is not formed on nor removable from the carriage but is made in the carriage 10 and forms part of it.

As a particular or limit case of this second configuration, it is possible to consider that wherein the tower 11 is substantially transversal to the axis of the carriage 10.

Figure 2:
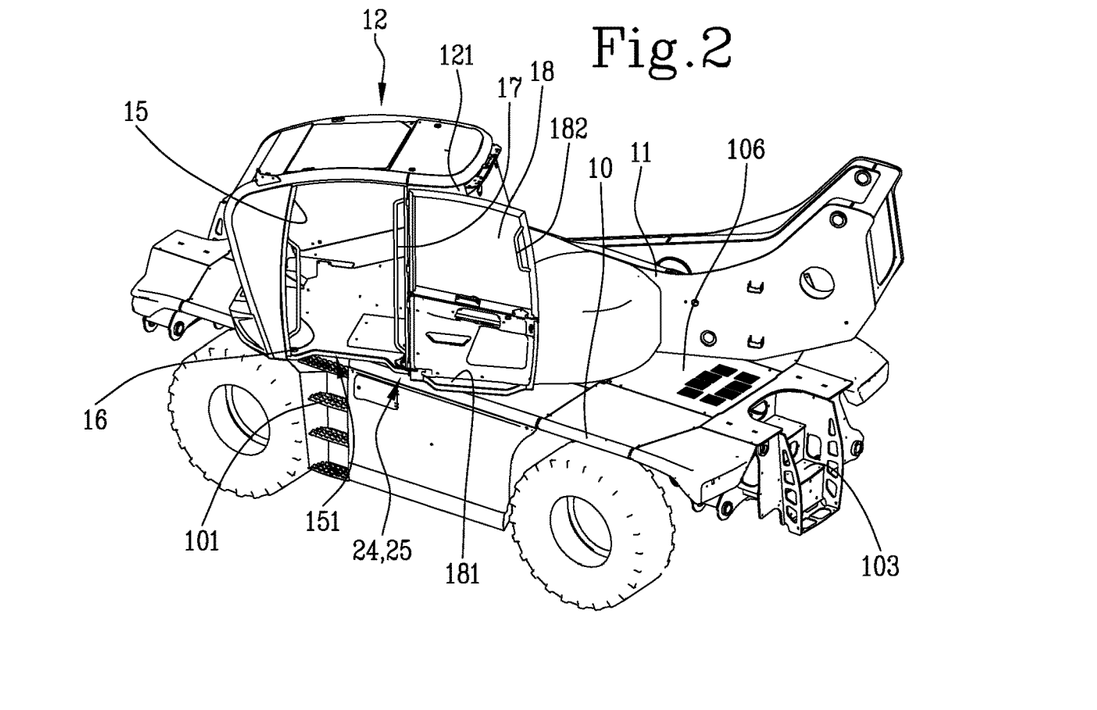
FIG. 2 is a rear perspective view of the telehandler according to the invention, with the door fully open and without the operating arm, as shown in the following drawings.
Figure 3:
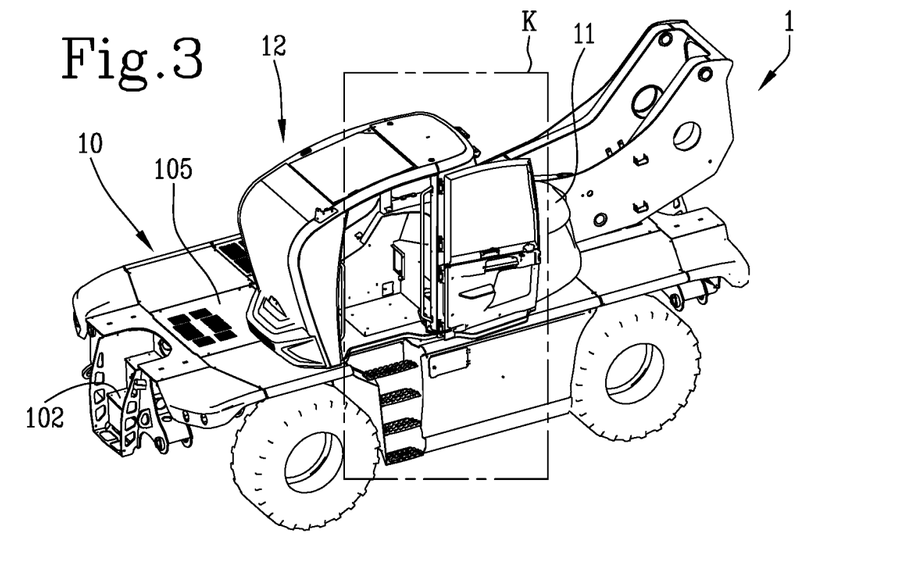
FIG. 3 is a front perspective view of the telehandler according to the invention, with the door fully open.
Figure 8:
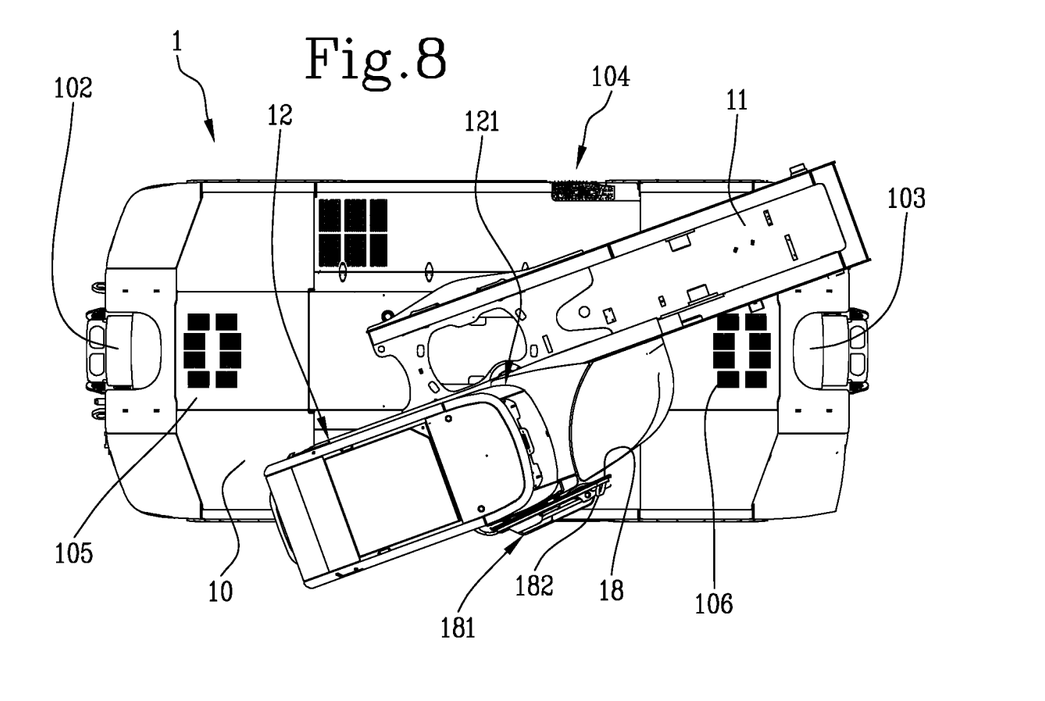

The third free path, shown in FIGS. 2 and 8, is defined by a rear angled position of the tower 11, wherein it is oblique relative to the axis of the carriage 10, with the door 15 of the cab 12 substantially facing towards a rear part of the carriage 10; again, this configuration comprises the case wherein the cab 12 is located substantially transversal to the carriage 10. More in general, in the third configuration of the telehandler 1, the front of the cab 12 faces towards the outside of the carriage 10.

The third path comprises the door 15, the above-mentioned second handle 17, which in generic terms is mounted on the most advanced side of the door 15, the second treadable surface 106 of the rear part of the carriage 10 and the third ladder 103 formed in the rear side of the carriage 10, that is, on the back.

The third ladder 103 is also incorporated in the carriage 10 and forms part of it.

Advantageously, the invention comprises a door 18 for closing the door 15 of the cab 12, oscillating about a hinge located on the side of the door 15, which moves between the following three operating positions: a closed position, wherein it obstructs the door 15 (see FIG. 1); a partly open position, wherein the door 18 does not obstruct the door 15 and protrudes towards the outside of the cab 12 (shown in FIGS. 5 and 7); and a completely open position, wherein the door 18 is wide open and does not protrude from the cab 12 (see FIGS. 2, 3, 4, 6, 8 and 9).

In the configurations of the telehandler 1 wherein this defines the first and second paths, the door 18 must be open and may be both in the partly open position, wherein, for example, it forms with the plane of the door an angle of approximately 90° facing towards the outside of the cab 12, and in the fully open position, the latter position being designed to characterise the configuration of the machine 1 wherein the third free access and descending path is defined.

Preferably, in the fully open position, the door 18 forms with the plane of the door 15 an external angle which is equal to or greater than 180°, to favour discerning and ascending between the cab 12 and the second treadable surface 106 of the rear part of the carriage 10, when the tower 11 is positioned oblique to the carriage 10 in its rear angled position.

This can be achieved by means of a cab 12 equipped with a rear portion 121 whose transversal dimensions are less than those of the cross-section where the door 15 is located, for example because it decreases towards the rear end, providing in practice a tapered shape.

Figure 9:
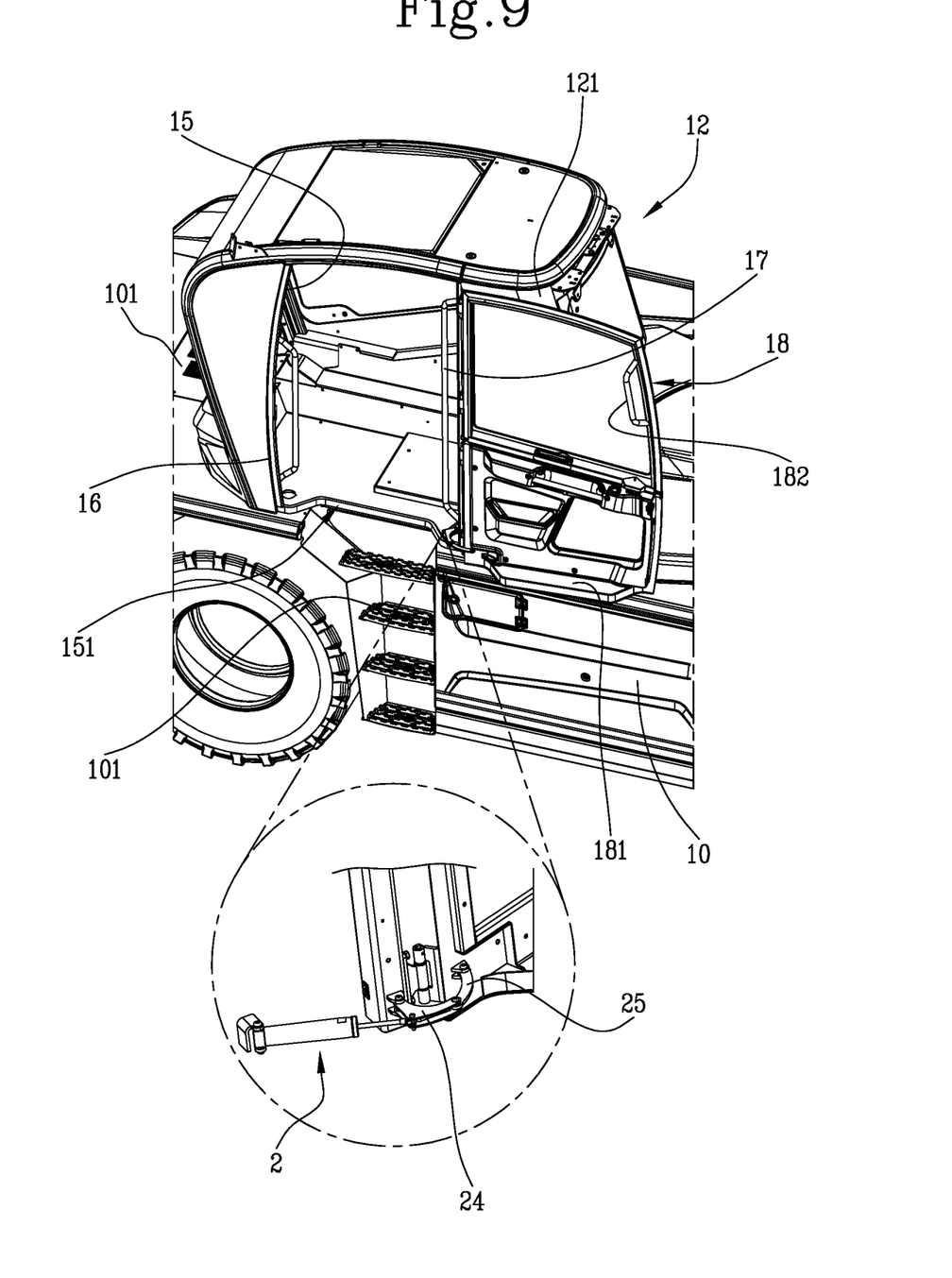
FIG. 9 is a partial perspective view of the side of the telehandler with an enlarged detail.

In this case, in the fully open position, the door 18 may be positioned adjacent to the outer surface of the rear portion 121 of the cab 12 and is kept stationary by means 2 for adjusting the position of the door (see FIG. 9).

Figure 10:
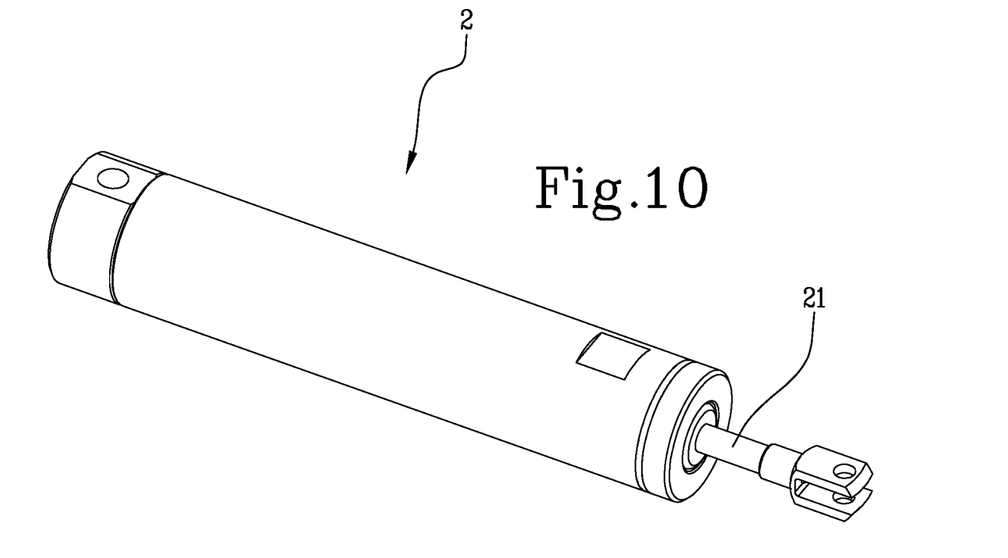
FIG. 10 is an axonometric view of an actuator used for moving the door of the cab of the telehandler.

These means may include a movement device 2 (shown in FIG. 10) which can be operated by the operator to automatically move the door 18 to the completely open position and keep it locked in position and to release the door 18, allowing it to return, for example, to the partly open position. According to a possible embodiment of the above-mentioned device 2, it may include a gas spring 21, a linear actuator 22 and an elastic return element 23, such as a spring, functionally connected to the linear actuator 22 (see FIG. 11).

Figure 11:
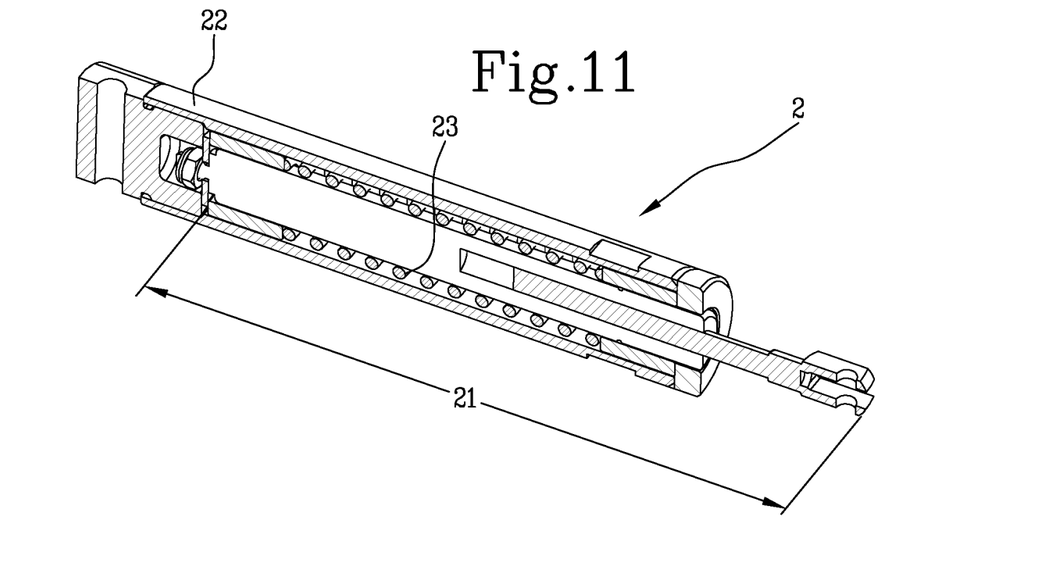
FIG. 11 is a longitudinal section of the actuator of the previous drawing.

In this case, the movement device may operate as follows.

Before descending, the operator in the cab unlocks the door 18 and pushes it in such a way that the gas spring 21 moves the door to the partly open position, after which, under the command of the operator, the linear actuator, for example a hydraulic cylinder 22, pushes the door 18 to the fully open position, thereby preloading the elastic return element 22, which may also be a spiral spring 23 such as that shown.

Clearly, when the actuator 22 is deactivated, the elastic element 23 returns the door 18 to the partly open position.

The actuation may be performed by a command in the cab 12 and/or by a remote control, for example hooked to the keys of the lock of the door 18; the latter feature is preferably adopted if the linear actuator 22 of the movement device 2 is electrical.

The distal end of the gas spring 21 may be connected to the door 18 by an intermediate kinematic mechanism 24, 25 formed by two or more connecting elements 24, 25 articulated to each other, as well as with the door 18 and the gas spring 21; the kinematic mechanism 24, 25 is rotatable about a vertical axis of rotation corresponding to a rotoidal connection located, for example, at the upright of the door.

Figure 4:
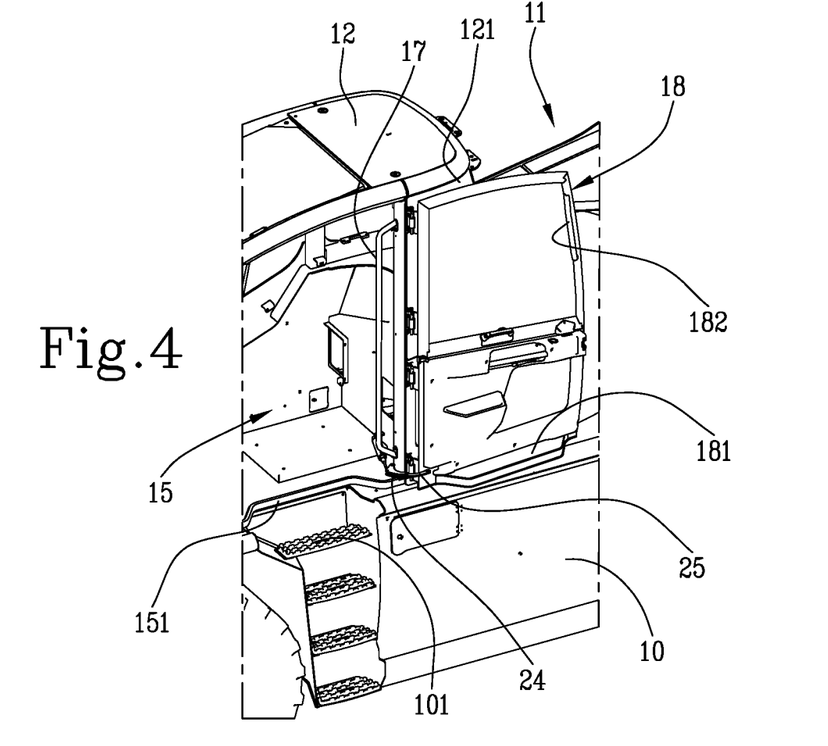
FIG. 4 is the detail K of FIG. 3 enlarged.
Figure 5:
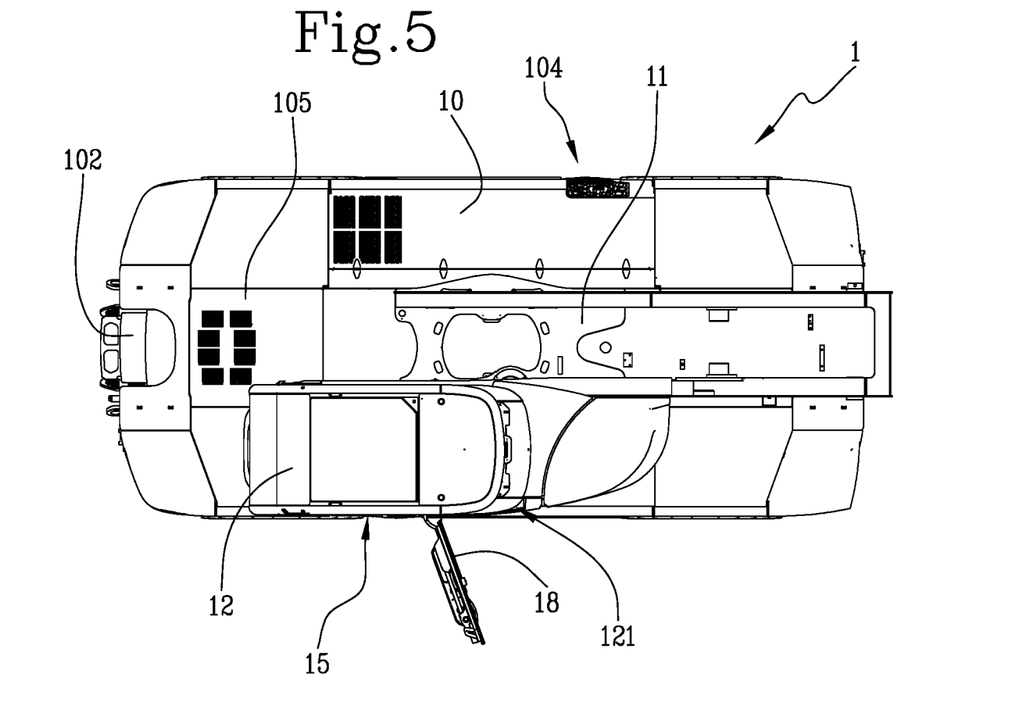
FIG. 5 is a top view of the telehandler with the door in a partly open position.
Figure 6:
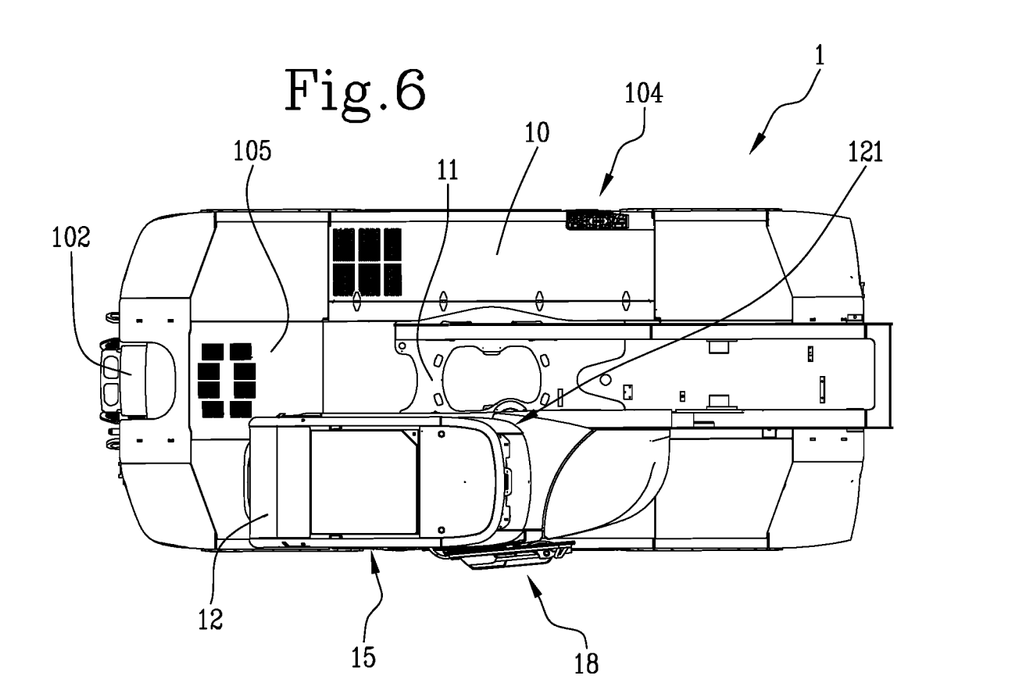
FIG. 6 is the view of FIG. 5 with the door in its fully open position.

Preferably, as shown in FIGS. 4 and 9, the two connecting elements 24, 25 have the shape of a circular sectors and can be inserted, with mutual overlapping, into each other, in an arrangement of minimum dimensions; in this way, the kinematic mechanism 24, 25 allows the partial opening corresponding to a first relative rotation with respect to the above-mentioned vertical axis and then allows the complete opening of the door 18, corresponding to a further rotation relative to the axis to which the outlet of element is added from the other, by means of a relative rotation which moves the two elements 24, 25 to be positioned in succession.

Preferably, the door 18 has at the inner side and in its lower portion a cantilevered surface 181 for resting the feet, the surface 181, in the fully open position, projecting outwards, as an aid for the passage between the door 15 of the cab 12 and the second treadable surface 106.

The plane of the door 18 may be shaped to match a recess 151, defined on the floor of the cab 12.

Moreover, there may also be a third gripping handle 182 mounted on the surface of the inner side of the door 18.

The fourth free path is defined by the rear position of the tower 11, wherein it has the relative axis parallel to that of the carriage 10, is positioned at 180° relative to the first path and comprises: the entrance door 15 and exit formed on the side of the cab 12, one or more handles 16, 17 and to which the operator can grip whilst ascending or descending and the fourth ladder 104 formed on a side of the carriage 10.

In this case, the cab 12 is located on the left of the operating arm 13 relative to the axis of the carriage 10, the fourth ladder 101 is formed on the right side of the carriage 10 and the door 15 is formed on the left side of the cab 12. In this case, too, the first and second handles 16, 17 already described are provided.

In other words, apart from the fact that the tower 11 is oriented in the opposite way to the first path, there is no difference in the configuration of the fourth path with respect to the first and the operator uses them in the same way.

The fifth free path is symmetrical to the second path with respect to a diagonal of the perimeter of the carriage 10, so it has not been shown.

In practice, the fifth path is defined by a rear angled position of the tower 11, wherein it is oblique relative to the axis of the carriage 10, with the door 15 of the cab 12 which is substantially facing towards a rear part of the carriage 10; also in this case, the front of the cab 12 faces towards the inside of the carriage 10.

The fifth path includes the door 15 of the cab 12, the above-mentioned first handle 16, the second treadable surface 106 of the rear part of the carriage 10 and the third ladder 103 formed on the rear side of the carriage 10.

The configuration of the telehandler 1 which defines the sixth free path is symmetrical to that of the third path.

In practice, the sixth free path is defined by a front angled position of the tower 11, wherein it is oblique relative to the axis of the carriage 10, with the door 15 of the cab 12 substantially facing towards a front part of the carriage 10; again, the configuration in question comprises the case wherein the cab 12 is located substantially transversal to the carriage 10.

More generally speaking, in the sixth configuration of the telehandler 1, the front of the cab 12 faces towards the outside of the carriage 10.

The sixth path comprises the door 15, the second handle 17, the first treadable surface 105 and the second ladder 102.

The operation according to the invention is summarised below.

If the operator must descend or ascend when the telehandler 1 is in its configuration of use wherein the tower 11 is aligned with the carriage 10, he/she will use the first or fourth ladder 101, 104 and the first and/or the second handle 16, 17 fixed to the opposite sides of the door 15.

If, on the other hand, the telehandler 1 is in one of the configurations for use wherein the tower 11 is misaligned from the carriage 10, with the front of the cab 12 facing inwards, then the operator who wants to descend to the ground from the cab 12 will open the door 18, for example moving it to the above-mentioned intermediate position and will descend on the carriage 10 with the aid of the first handle 16; from here he/she will follow the first or the second treadable surface 105, 106 up to the second or third ladder 102, 103 to reach the ground; obviously, the reverse path is possible.

If the telehandler 1 is in an operating configuration wherein the tower 11 is oblique relative to the carriage 10 and with the front of the cab 12 facing outwards, the operator will move the door 18 to the completely open position and, using the lower supporting surface 181 of the door 18, the second and/or the third handle 17, 182, will descend on the carriage 10; from here, moving along the first or second treadable surface 105, 106 he/she will reach the third or second ladder 103, 102 and therefore reach the ground.

The invention claimed is:

1. A rotary telehandler comprising a carriage movable on wheels, which mounts a tower, which in turn mounts a driver's cab and an operating arm, wherein the telehandler is equipped with the following free paths of ascent and descent: a first path, defined by a first position of the tower, wherein it has an axis parallel to that of the carriage and comprises a door of the cab, at least one handle on which an operator can grasp and a first ladder made on a side wall of the carriage; a second path, defined by an angled position of the tower, wherein it is oblique or transversal to the axis of the carriage, with a front of the cab facing towards the inside of the carriage, said second path comprising the door, at least a first handle of the at least one handle mounted at a first side of the door, a first treadable surface of the carriage and a second ladder made in a side of the carriage; and a third path, defined by a further angled position of the tower, wherein it is oblique or transversal to the axis of the carriage, with said front of the cab facing towards the outside of the carriage, said third path comprising the door, at least a second handle mounted at a second side of the door, a second treadable surface of the carriage and a third ladder made in a further side of the carriage; said first, second and third paths being free of obstacles for the free passage of an operator.

2. A rotary telehandler comprising a carriage movable on wheels, which mounts a tower, which in turn mounts a driver's cab and an operating arm, equipped with six free paths of ascent and descent which comprise, respectively:
   a door of the cab, a first handle to which an operator can grip whilst ascending or descending and a first ladder made on a first side of the carriage;
   the door of the cab, the above-mentioned first handle, a first treadable surface of a front part of the carriage and a second ladder made in the front part of the carriage;
   the door, a second handle, a second treadable surface of a rear part of the carriage and a third ladder made in the rear part of the carriage;
   the door, the first handle to which the operator can grip whilst ascending or descending and a fourth ladder made on a second side of the carriage;
   the door, the first handle, the second treadable surface and the third ladder; and
   the door, the second handle, the first treadable surface and the second ladder.

3. The telehandler according to claim 1, wherein the cab comprises a panel for closing the door of the cab, said panel oscillating about a hinge located to the side of the door and being designed to move between the following three operating positions: a closed position, wherein it obstructs the door; a partially open position, wherein the panel does not obstruct the door and protrudes towards the outside of the cab; and a completely open position, wherein the panel does not protrude from the cab.

4. The telehandler according to claim 3, wherein in the completely open position the panel forms with a plane of the door an outer angle which is equal to or greater than 180°.

5. The telehandler according to claim 3, wherein the panel has, at a relative lower portion, a surface for resting feet.

6. The telehandler according to claim 3, wherein the panel comprises, mounted on an inner surface, the third handle for the operator.

7. The telehandler according to claim 3, wherein in at least the above-mentioned third free path for ascending and descending the panel is in its completely open position.

8. The telehandler according to claim 3, comprising a movement device which can be operated by the operator for automatically moving the panel to the completely open position and keeping it locked in position and for releasing the panel, to allow it to return to the partly open position.

9. The telehandler according to claim 8, wherein said device includes a gas spring, a linear actuator and an elastic return element functionally connected to the linear actuator.

10. The telehandler according to claim 1, wherein the cab is located to the left of the operating arm relative to the direction of travel of the carriage, the first ladder is made on a left-hand side of the carriage, the first handle of the at least one handle is made on a left-hand side of the door of the cab, relative to the direction of entry and the second handle of the at least one handle on an opposite side.

* * * * *